No. 617,619. Patented Jan. 10, 1899.
L. VAN DORIN.
PUNCH AND SHEARS.
(Application filed Apr. 18, 1898.)
(No Model.)
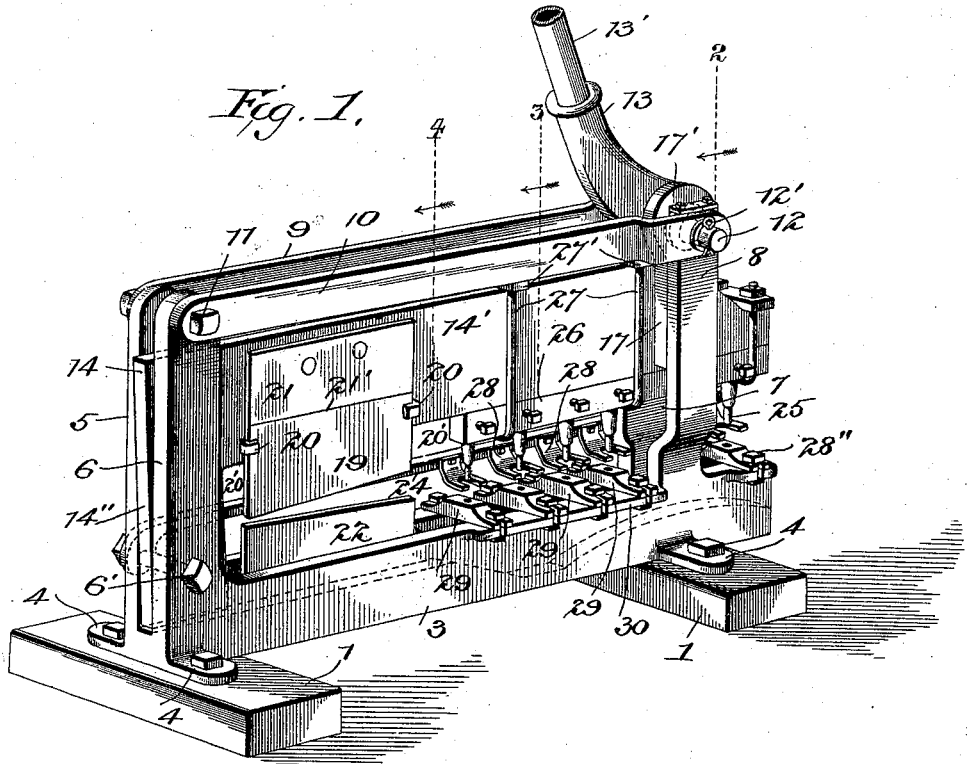
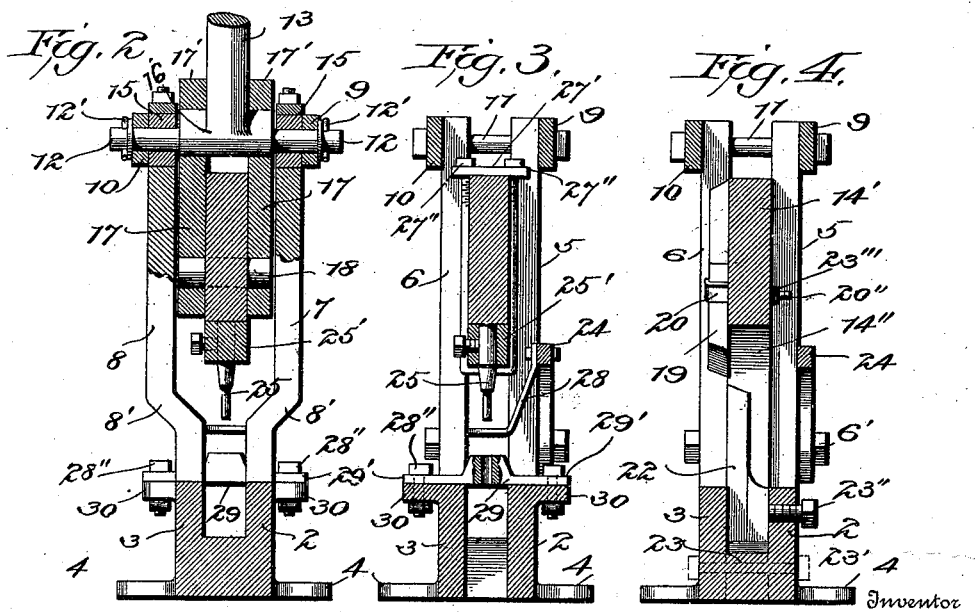
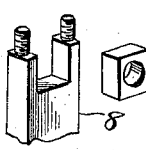
Witnesses
Inventor
Lewis Van Dorin
by Rhesa G. Du Bois
his Attorney

UNITED STATES PATENT OFFICE.

LEWIS VAN DORIN, OF SAN BERNARDINO, CALIFORNIA.

PUNCH AND SHEARS.

SPECIFICATION forming part of Letters Patent No. 617,619, dated January 10, 1899.

Application filed April 18, 1898. Serial No. 678,044. (No model.)

*To all whom it may concern:*

Be it known that I, LEWIS VAN DORIN, a citizen of the United States, residing at San Bernardino, in the county of San Bernardino and State of California, have invented certain new and useful Improvements in Punches and Shears; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to those combined shears and punches wherein a hand-lever is used to actuate another lever carrying shears close to its fulcrum and punches between the shears and the free end of the lever.

The object of my device is to combine increased power with greater simplicity, durability, and cheapness.

To this end my invention consists in the peculiarly constructed and arranged hand-lever and its connections, with the knife and punch-carrying lever, the frame, dies, and other peculiarities, which will be more fully described hereinafter and pointed out in the claims.

In the accompanying drawings, Figure 1 represents a perspective view of my complete invention; Fig. 2, a front detail view of the hand-lever connections and its immediate parts, wherein portions are shown in section at the line 2 in Fig. 1. Fig. 3 is a detail view in transverse section at the line 3 of Fig. 1, and Fig. 4 is a transverse detail view through the line 4. Fig. 5 is a detail.

The numeral 1 denotes the base portion on which the frame is mounted. This main frame consists of a pair of duplicate metal horizontal bars 2 and 3, placed side by side and secured to the base 1 by brackets 4. From the rear ends of these bars 2 and 3 rise vertical standards 5 and 6, which are made integral with the horizontal bars. A pair of vertical standards 7 and 8 also rise from the front part of the bars 2 and 3. The tops of the standards are connected by a pair of bars 9 and 10, the rear ends of these being fastened by a single bolt 11 and the front ends by keys 12' on the ends 12 of the fulcrum-pin of the hand-lever 13.

14 represents an L-shaped rocking lever disposed between the standards, with its shank 14' extending horizontally and its short arm 14" extending substantially vertical. The lower end of the short arm 14" is fulcrumed on a transverse stud 6', passing completely through the lower portions of the two standards 5 and 6. Sufficient space is left between the standards to permit the lever 14 to rock freely, but not have too much lateral play. The means for actuating this lever 14 consists of the hand-lever 13, fixed to rock in the bearing-blocks 15, mounted in the tops of the front standards 7 and 8, and the lever is provided with an eccentric 16, made integral therewith.

The free end of the lever 14 is connected with the eccentric by a pair of links 17, secured thereto at their lower portions by a pin 18 and at their upper ends by rings 17', which closely embrace the eccentric. Offsets 8' are formed in the two front standards 7 and 8 to accommodate between them the two links 17 and the end of the lever 14, all of which are made to fit neatly between the standards. The length of the pin 18 is just sufficient to be held closely between the two standards without being otherwise fastened. This pin 18 is cylindrical in shape and will pass freely but snugly into the three coincident holes made through the two links and lever for its reception. By this means these parts can be quickly made and assembled or taken apart with great facility.

The handle 13' of the hand-lever 13 is extended to a considerable length to get greater power.

The knives or shearing portion of my device consists of a knife 19, composed of a flat plate of steel rectangular in general outline and held between two grippers 20, which overlap and grip the ends 20' and hold it snugly against the flat side of the lever 14. These grippers are provided with threaded shanks 20", which pass through the lever and are provided with nuts 23''', by means of which they are tightened or loosened to grip or release the knife. The edgewise strain brought to bear upon the knife in the cutting operation is resisted by a rectangular plate 21, rigidly riveted to the lever 14. Its lower edge 21' is straight to meet the straight top edge of the knife and thereby form an equal bearing-surface throughout. The lower knife 22 consists of a substantially rectangular flat piece of steel, which rests upon a resisting-plate 23. Set-screws 23" pass through the bar 3 to hold the lower knife securely in place. The plate 23 may be cast solid between the bars 2 and 3 when the frame of the machine is made of cast metal, or it might be made separate, as shown in dotted lines in Fig. 4, and the parts held together by bolts 23'.

In cutting a bar of metal it will often be forced upward by the pressure of the knife. To overcome this, a bar 24 is extended horizontally across from upright 5 to 7, so that one end will be on a level slightly above the top of the lower knife in juxtaposition to catch and hold down on the top of the bar while under treatment between the knives. On the other end a series of strippers 28 28 are secured.

The punching mechanism consists of a series of punches 25 of like or graduated dimensions. In the present instance they are alike, so that a description of one will suffice for all. These punches are located under the lever 14 and are set in sockets 25' in a detachable bar 26, and the latter is securely held up against the lever by two or three U-shaped yokes 27 27, which embrace the socket-bar and lever. The upper ends of the yokes are screw-threaded and pass through cross-bars 27', which are clamped down on the upper edge of the lever by nuts 27", thereby providing a simple and convenient means of attaching and detaching the punches.

The punch-sockets 25' extend entirely through the bar 26 and are provided with set-screws to lock the punches in place, said set-screws being loosened to permit the punches to drop out.

Adjustable dies 29 are provided for each punch. These dies consist of an oblong piece of metal having a thick central portion containing the punch-receiving aperture and thinner ends 29', punctured to receive the upper threaded ends of two vertical bolts 28". The latter pass through the opposite sides of the flanges 30.

The forward ends of the horizontal bars 2 and 3 and the lever 14 are extended beyond the front standards for the purpose of providing a punch at the extreme front end of the machine for single punching, and only one punch serves at a time, though they all operate at the same time.

The preferred construction of my device having been set forth, I will now proceed to describe its operation.

When a bar of metal is placed between the knives and the hand-lever is pulled forward, the eccentric 16 turns on its axis, thereby forcing downward the links 17, which carry with them the free end of the lever 14 through the medium of the pin 18 and severing the bar. This compound leverage exerts a powerful force in proportion to the size of the parts and produces an exceedingly-efficient machine especially adapted for use in blacksmith and repair shops. The punches are operated in precisely the same way and with a force proportionate to their distances from the fulcrum of the lever 14. It will be observed that the knife and punches are so arranged and adjusted on the lever and in relation to the lower knife and dies that while the movement of the latter is in the arc of a circle their action on the object to be cut or punched is practically straight.

What I claim as new, and desire to secure by Letters Patent, is—

1. In a metal-working hand-punch, the combination with a base portion, of a frame provided with a pair of front and a pair of rear standards, an L-shaped tool-carrying rock-lever fulcrumed to be operated up and down between said standards, a hand-lever provided with an eccentric operating between the front standards, and a pair of links embracing the eccentric and connected to the tool-carrying lever, substantially as described.

2. In a hand-operated metal shearing and punching machine, the combination with the frame and standards, of a substantially L-shaped tool-carrying rock-lever fulcrumed therein, a hand-lever provided with an eccentric at the fulcrum, a pair of links provided with rings at their upper ends embracing the eccentrics, and means for pivotally connecting the lower portion of the links with the free end of the rock-lever, substantially as described.

3. In a metal shearing and punching machine, the combination with a frame provided with a pair of front and rear standards, a tool-carrying lever operating between said standards, a hand-lever provided with an eccentric, and a pair of links embracing the eccentric and connected to the tool-carrying lever.

4. The combination in a shearing and punching machine, of a frame having uprights, a tool-carrying lever, an operating-lever, links extending from the operating-lever to the tool-carrying lever, and a fixed bar for preventing the metal being cut from being forced upward by the knife.

In witness whereof I affix my signature in presence of two witnesses.

LEWIS VAN DORIN.

Witnesses:
CHAS. E. DUNSCOMB,
KENDALL HOLT.